(12) United States Patent
Sargent

(10) Patent No.: US 7,308,161 B2
(45) Date of Patent: Dec. 11, 2007

(54) SYSTEM AND METHOD FOR WAVELENGTH SELECTIVE SWITCHING EMPLOYING SINGLE-ELEMENT GRATINGS

(75) Inventor: Edward H. Sargent, Toronto (CA)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/274,649

(22) Filed: Nov. 15, 2005

(65) Prior Publication Data

US 2007/0110353 A1    May 17, 2007

(51) Int. Cl.
*G02F 1/295* (2006.01)
*G02F 1/035* (2006.01)
*G02F 1/01* (2006.01)
*G02B 6/34* (2006.01)

(52) U.S. Cl. ............... 385/10; 385/1; 385/2; 385/3; 385/4; 385/8; 385/9; 385/16; 385/17; 385/24; 385/31; 385/37

(58) Field of Classification Search ............ 385/10
See application file for complete search history.

(56) References Cited

U.S. PATENT DOCUMENTS

| | | | |
|---|---|---|---|
| 4,737,007 A | 4/1988 | Alferness et al. | |
| 6,192,177 B1 | 2/2001 | Amundson et al. | |
| 6,208,773 B1* | 3/2001 | Wickham et al. | 385/10 |
| 6,549,707 B1 | 4/2003 | Lupu et al. | |
| 2003/0063831 A1* | 4/2003 | Xie et al. | 385/10 |
| 2003/0086647 A1 | 5/2003 | Willner et al. | |
| 2005/0099662 A1 | 5/2005 | Sutherland et al. | |

FOREIGN PATENT DOCUMENTS

WO    9954714    10/1999

OTHER PUBLICATIONS

A. Othonos et al., "Superimposed Multiple Bragg Gratings," Electronic Letter, vol. 30, No. 23, 1994, pp. 1972-1974.
W.C. Swann et al., "Hybrid Multiple Wavelength Reference Using Fiber Grating and Molecular Absorption," Proc. Bragg Gratings, Photosensitivity and Poling in Glass Wavelength, OSA Technical Digest, Optical Society of America, 1999, pp. 63-65.
H. Ishii et al., "Quasicontinuous Wavelength Tuning in Super-Structure-Gratings (SSG) DBR Lasers," IEEE Journal of Quantum Electronics, vol. 32, No. 3, 1996, pp. 433-441.
I.A. Avrutsky et al., "Multiwavelength Diffraction and Apodizatrion Using Binary Superimposed Gratings," IEEE Photonics Tech. Letters, vol. 10, No. 6, 1998, pp. 839-841.
V. Jayaraman et al., "Theory, Design, and Performance of Extended Tuning Range Semiconductor Lasers With Sampled Gratings," IEEE Journal of Quantum Electronics, vol. 29, No. 6, 1993, pp. 1824-1834.

* cited by examiner

*Primary Examiner*—Frank G. Font
*Assistant Examiner*—Ryan Lepisto
(74) *Attorney, Agent, or Firm*—Gauthier & Connors LLP

(57) ABSTRACT

A wavelength selective switch device is disclosed that includes an elongated signal communication path extending from a first end of the device to a second end of the device. The signal communication path extends through a plurality of regions of varying indices of refraction, and the plurality of regions includes adjustable regions that are each coupled to an adjustable voltage source for changing a voltage potential across each of the adjustable regions such that the index of refraction of said adjustable regions may be changed by changing the voltage potential across each adjustable region.

18 Claims, 6 Drawing Sheets

SYSTEM AND METHOD FOR WAVELENGTH SELECTIVE SWITCHING EMPLOYING SINGLE-ELEMENT GRATINGS

BACKGROUND OF THE INVENTION

The invention relates to wavelength selective switches, and relates in particular to wavelength selective switches that may be used in a multiplexing switching system.

Wavelength selective switches include a variety of structures such as fiber grating couplers that permit all but a specified wavelength of light to pass through the coupler. For example, U.S. Pat. No. 4,737,007 discloses a wavelength selective contra-directional coupler for use in wavelength division multiplexing that includes a Bragg diffraction grating having a fixed period. U.S. Pat. No. 6,549,707 discloses a grating type optical filter that provides an apodized response by varying the distance between grating elements.

Superimposed multiple Bragg gratings are disclosed in A. Othonos, X. Lee and R. M. Measures, "Superimposed Multiple Bragg Gratings", Electronics Letters, Vol. 30, No. 23, pp. 1972-1974, (1994) in which more than one grating is inscribed at the same location on an optical fiber to provide a comb filter by varying the period of different grating elements. Serial inscription of a second grating, however, typically results in a reduction of reflectance of an first grating as disclosed in W. C. Swann, M. A. Hubbard and S. L. Gilbert, "Hybrid Multiple Wavelength Reference Using Fiber Grating and Molecular Absorption", Proc. Bragg Gratings, Photosensitivity and Poling in Glass Wavelength, OSA Technical Digest (Optical Society of America), pp. 63-65 (1999). It has also been disclosed that performance may be degraded with an increase in the number of superimposed gratings in H. Ishii, H. Tanobe, F. Kano, Y. Tohmori, Y. Kondo, and Y. Yoshikuni, "Quasicontinuous Wavelength Tuning in Super-Structure-Gratings (SSG) DBR Lasers", IEEE Journal of Quantum Electronics, Vol. 32, No. 3, pp. 433-441 (1996).

Multi-wavelength diffraction and apodization are disclosed using binary superimposed gratings in I. A. Avrutsky, M. Fay and J. H. Xu "Multiwavelength Diffraction and Apodizatrion Using Binary Superimposed Gratings", IEEE Photonics Tech. Letters, Vol. 10, No. 6, pp. 839-841, (1998) in which the grating is segmented into sections of grouped segments permitting step-like apodization while maintaining a binary index and base segment size.

A sampled grating is disclosed in V. Jayaraman, Z. Chuang, and K. Coldren, "Theory, Design, and Performance of Extended Tuning Range Semiconductor Lasers With Sampled Gratings", IEEE Journal of Quantum Electronics, Vol. 29, No. 6, pp. 1824-1834 (1993) in which grating elements are removed in a periodic fashion.

There is a need however, for a more efficient and economical wavelength selective switch that may be used in a multiplexing switching system, and that may be modified during use.

SUMMARY OF THE INVENTION

The invention provides a wavelength selective switch device in accordance with an embodiment that includes an elongated signal communication path extending from a first end of the device to a second end of the device. The signal communication path extends through a plurality of regions of varying indices of refraction, and the plurality of regions includes adjustable regions that are each coupled to an adjustable voltage source for changing a voltage potential across each of the adjustable regions such that the index of refraction of said adjustable regions may be changed by changing the voltage potential across each adjustable region.

BRIEF DESCRIPTION OF THE DRAWING

The following description may be further understood with reference to the accompanying drawings in which.

The drawings are shown for illustrative purposes and are not to scale.

DETAILED DESCRIPTION OF THE INVENTION

The invention provides a system for reconfiguring a fixed pitch grating in a programmable fashion to allow selective transmission or deflection of an arbitrarily chosen set of closely-spaced wavelengths of signals, such as optical signals. The grating may be constructed with a fixed periodicity, and provides for analog tuning of the refractive index of many of the individual grating elements. Either each element or every other element for example, may be independently addressed to provide one or more periodicities for wavelength selective responses.

The grating, therefore, may serve as a programmable add/drop element for a multiplexing system, and may be suitable for inclusion as an element in an N×N array of such gratings, each of which may be independently addressed. This may permit construction of a switch that provides fast, compact, non-blocking routing of many spatial channels, each containing many different wavelengths of signals carrying independent data.

Figure 1:
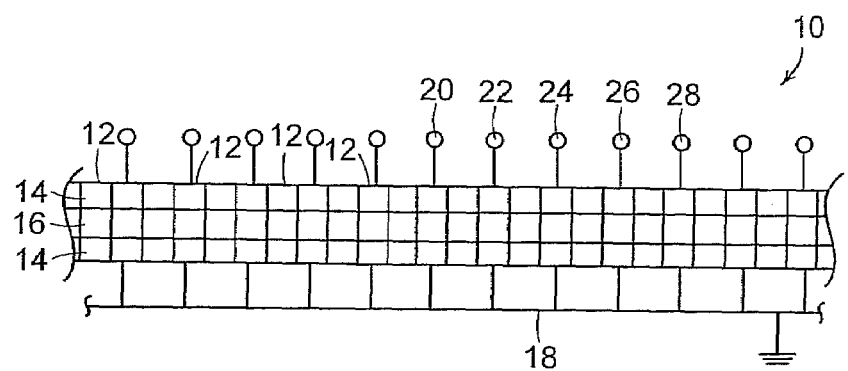
FIG. 1 shows an illustrative diagrammatic view of a wavelength selective switch in accordance with an embodiment of the invention.

As shown in FIG. 1, a grating 10 may include a plurality of equally spaced elements 12, each of which includes a cladding material 14 and a central core material 16. The elements (and fiber) may be circular in cross section such that the cladding material 14 encircles the core material 16. Every other grating element may be coupled at one end (e.g., the bottom as shown in FIG. 1) to ground as shown at 18, and may be coupled at the other end (e.g., the top as shown in FIG. 1) to a voltage source (e.g., 20, 22, 24, 26, 28) that are each independent of one another. This provides that while the index of refraction of core material in half of the elements remains constant, the index of refraction of the core material in each of the other elements may be independently adjusted by changing the voltage at each node separately. Changing the voltage across the cladding of an element changes the index of refraction of the core material within the element. The core and cladding materials should be chosen to have different indexes of refraction to provide the necessary waveguide properties. The fixed material may, for example, include indium phosphide (InP), silica ($SiO_2$), polymers such as poly-methyl methacrylate (PMMA), sol-gel glasses, and the active material may include, for example, lithium niobate ($NLiNBO_3$), azobenzene-doped polymers such as PMMA, barium titanate ($BaTiO2$), indium galium arsenide phosphide (InGaAsP) qauntum sells, or poled polymers. The voltages to be applied to the active material may be varied between about 5 volts to about 100 volts.

To reflect a single wavelength, the pitch of the grating is chosen such that $\lambda_w = 2\bar{n}\lambda_g$ where $\lambda_w$ is the free-space wavelength of the optical mode in question, $\bar{n}$ is the average index of refraction of the grating medium, and $\lambda_g$ is the physical periodicity of the grating. The Fourier component of the refractive index needed to implement this grating may be expressed as:

$$n(z) = \bar{n} + \Delta n \cos(2\pi z/\lambda_g)$$

where $\Delta n$ is the amplitude of the index of modulation along the grating. This equals:

$$n(z) = \bar{n} + \Delta n \cos(4z/\lambda_w)$$

Figure 2:
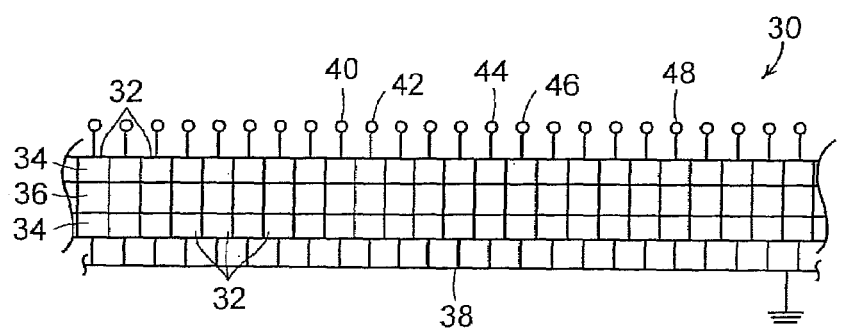
FIG. 2 shows an illustrative diagrammatic view of a wavelength selective switch in accordance with another embodiment of the invention.
Figure 3:
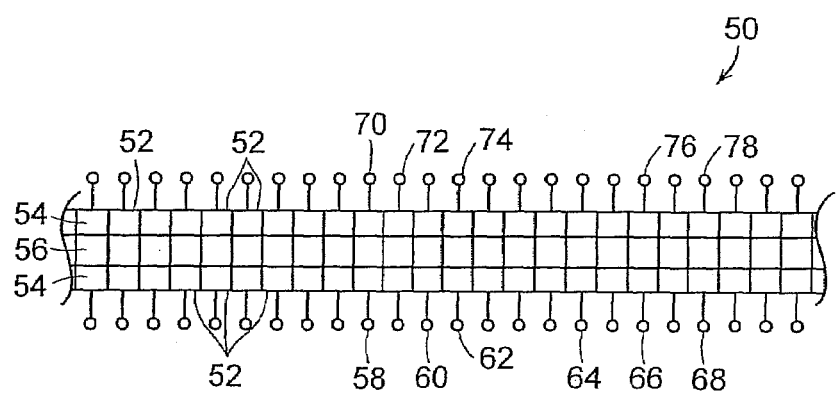
FIG. 3 shows an illustrative diagrammatic view of a wavelength selective switch in accordance with a further embodiment of the invention.

As shown in FIG. 2, a grating 30 in accordance with another embodiment of the invention may include elements 32 each of which includes a cladding 34 and a core 36, and each of which is coupled to ground 38 and a separate independent voltage source (e.g., 40, 42, 44, 46, 48). Having the index of refraction of all of the elements separately adjustable may provide further flexibility in certain embodiments. Similarly, a grating 50 may be provided in accordance with a further embodiment that includes elements 52 each of which includes a cladding 54 and a core 56, and each of which is coupled to a first set of separate independent voltage potentials (e.g., low voltage sources 58, 60, 62, 64, 66, 68) and a second set of separate independent voltage sources (e.g., higher voltage sources 70, 72, 74, 76, 78). Again, the freedom to further modify the independent voltage sources may provide increased flexibility in designing gratings, particularly multi-wavelength superimposed gratings.

Figure 4:
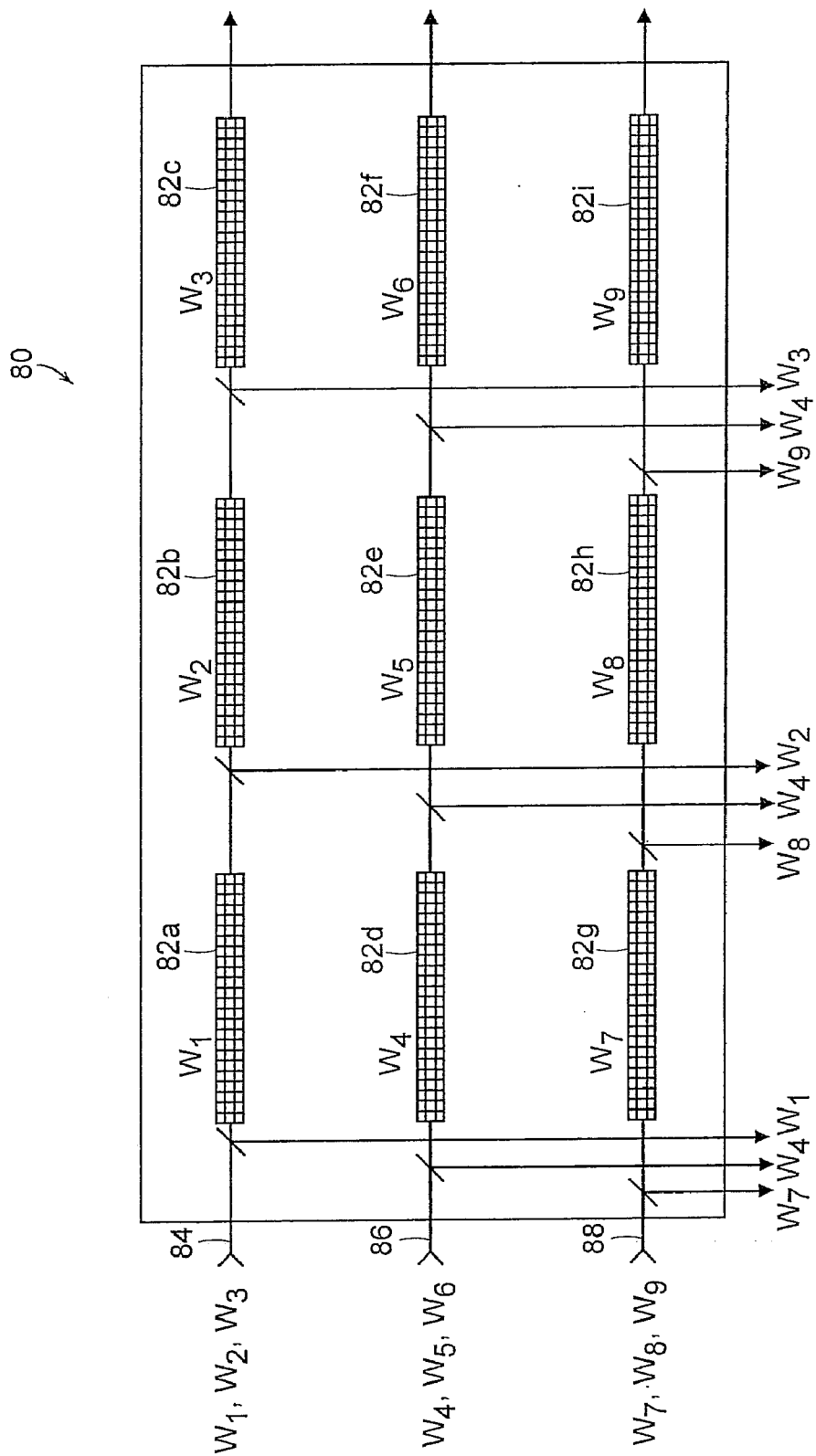
FIG. 4 shows an illustrative diagrammatic view of a wavelength selective switching system including wavelength selective switches in accordance with a further embodiment of the invention.

As shown in FIG. 4, a multiplexing circuit 80 may be provided in accordance with an embodiment of the invention that includes a plurality of discrete switching elements 82a-82i, each of which is designed to contra-directionally switch a particular wavelength of an incoming signal 84, 86 and 88 as shown.

If two different wavelengths are to be coupled in the Bragg grating, their design index contrast profiles may be added together to obtain:

$$n'(z) = \bar{n} + \Delta n [\cos(4\pi\bar{n}z/\lambda_1) + \cos(4\pi\bar{n}z/\lambda_2)]$$

This may be expressed as:

$$n'(z) = \bar{n} + F(z) * \cos(4\pi\bar{n}z/\lambda')$$

where $1/\lambda' = (1/\lambda_1 + 1/\lambda_2)$, and where $F(z)$ is a slowly varying quantity. This suggests that the pitch of the grating $\lambda'_g = \lambda'/2\bar{n}$.

Figure 5:
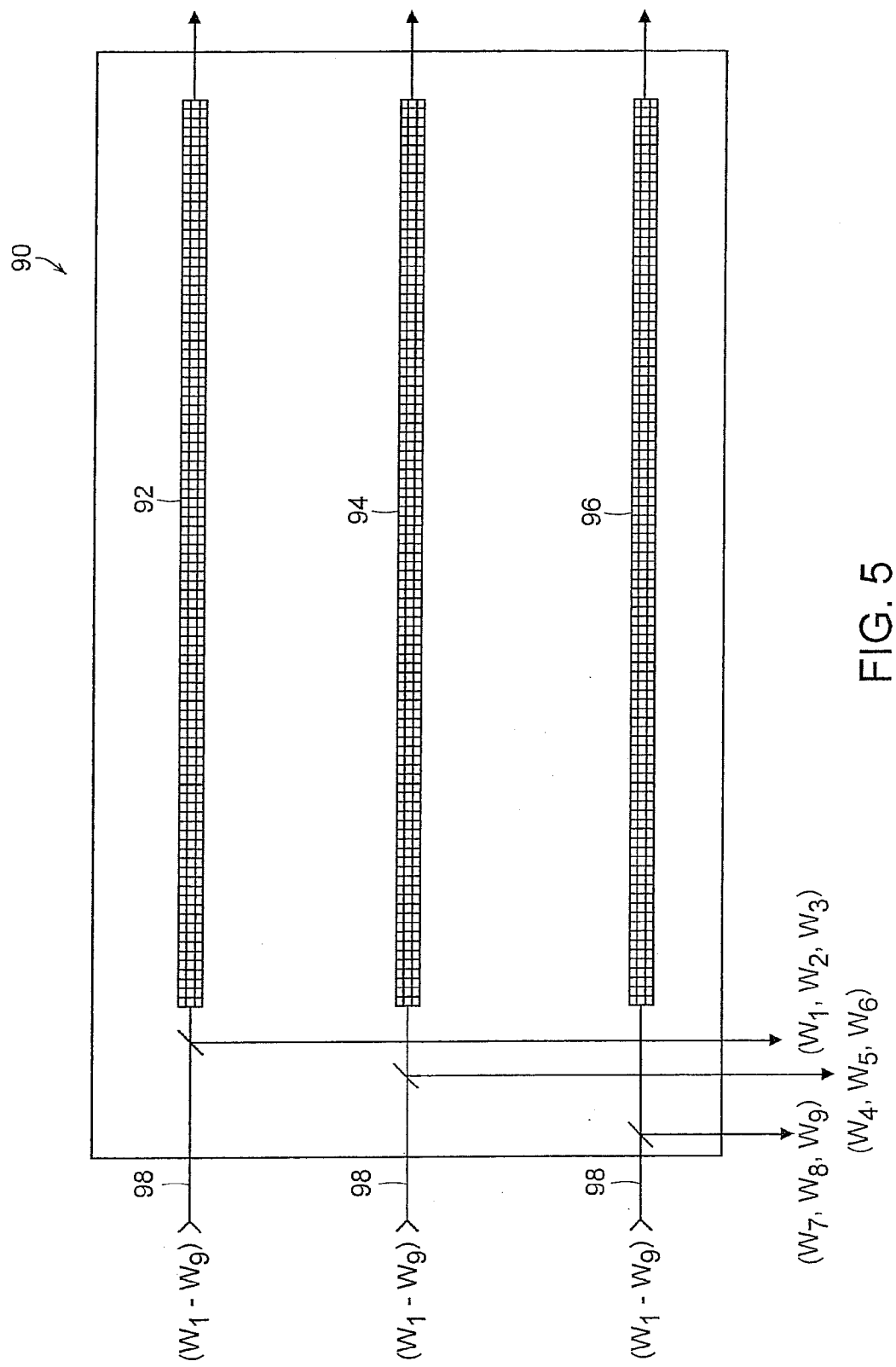
FIG. 5 shows an illustrative diagrammatic view of another wavelength selective switching system including wavelength selective switches in accordance with a further embodiment of the invention.

FIG. 5 shows a wavelength selective multiplexing system 90 that includes superimposed grating elements 92, 94 and 96, each of which receives a multi-frequency input signal 98 and filters different sets of frequencies as shown. Such a system may be implemented, therefore, by keeping the periodicity of the pitch fixed, and instead altering the $\bar{n}$ to effect the newly defined pseudo averaged-resonance condition for the superimposed system of gratings.

Figure 6:
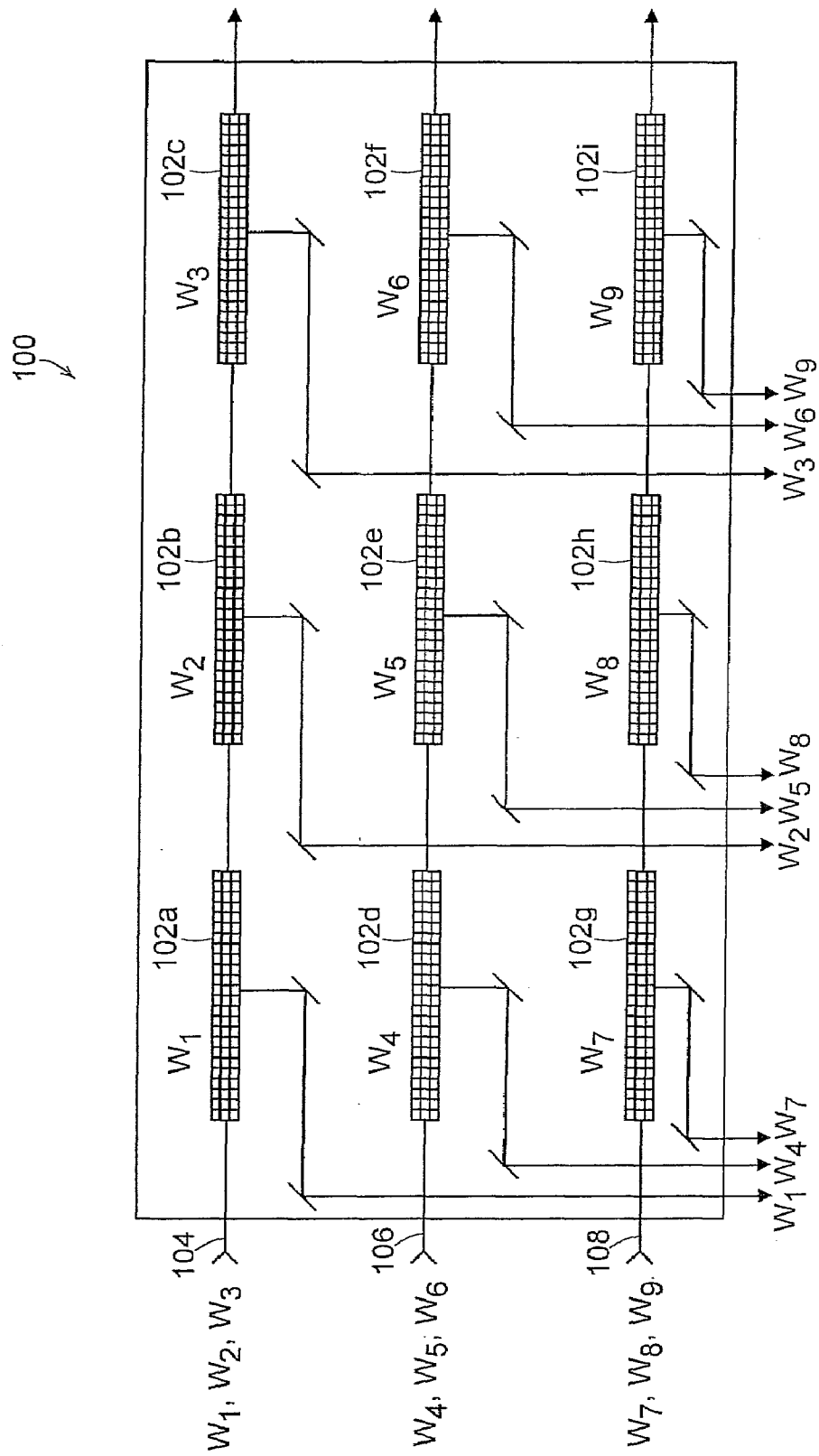
FIG. 6 shows an illustrative diagrammatic view of a wavelength selective switching system including wavelength selective switches in accordance with a further embodiment of the invention.

In further embodiments, a multiplexing circuit 100 may be provided as shown in FIG. 6 that includes a plurality of discrete switching elements 102a-102i, each of which is designed to out-coupling grating the direct a selective output signal at a pre-determined angle (e.g., 90 degrees) to the element to selectively de-direct a particular wavelength of an incoming signal 104, 106 and 108 as shown.

The slowly-varying modulation in the grating profile along its length $F(z)$ is readily implemented as long as analog control of each adjustable element is obtained. This provides a slowly-varying index contrast function, whereas the fast-varying cosine term serves to achieve the desired average pitch. The pitch, therefore, may be kept fixed, the average index may need to be tuned, but only over a fractional range corresponding at most to the largest fractional separation among wavelengths. In a directional wavelength division multiplexing system, the fractional separation may be about 5%. The contrast term may also remain slowly-varying.

The following procedure may be followed to determine the design of such a grating. First an idealized (pre-sampled) Fourier component $n(z)$ as discussed above. The sum of the refractive index profiles of the original single-component grating $n_j(z)$ should also be obtained. For each fixed-length period of the programmable grating, an average of $n(z)$ over that period is obtained. This will be the value of $\bar{n}(z)$ to be implemented in that period. Then the desired index contrast within that period is obtained by evaluating the inner product of $n(z)$ with $\cos(2\pi z/\lambda')$ over each fixed-length period of the programmable grating. The resulting $\bar{n}$ and $\Delta n$ for that period of the grating are then implemented. The grating then consists of two independently-tunable refractive index materials $n_{1j}$ and $n_{2j}$ that may be tuned by configuring their indices such that $(n_{1j}+n_{2j})/2 = \bar{n}$ for that segment, and $n_{1j} - n_{2j} = \Delta n$ for that segment.

Figure 7:
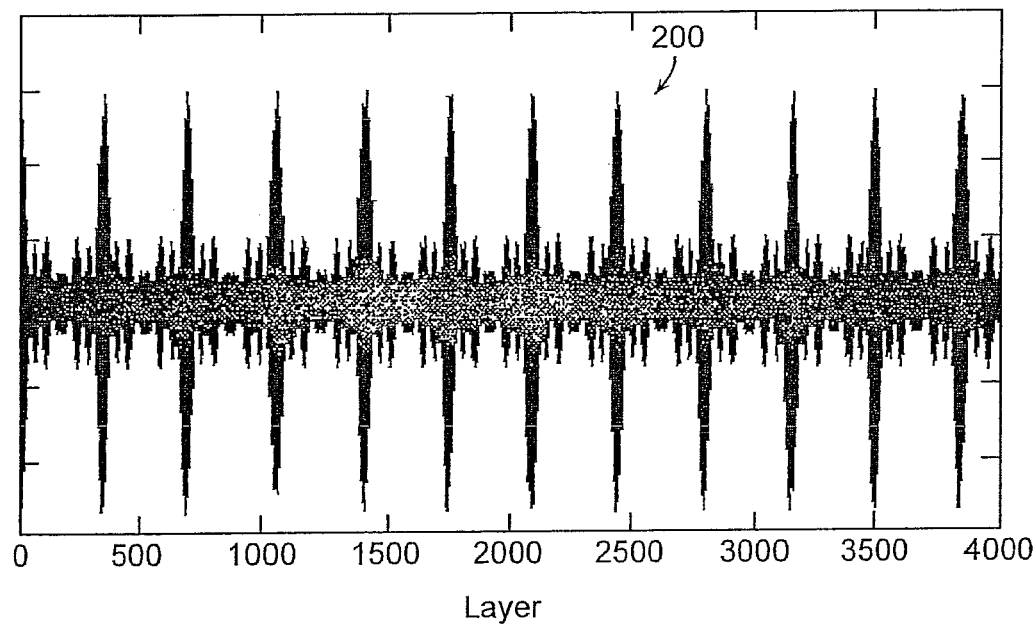
FIG. 7 shows an illustrative graphical representation of the refractive index profile over a grating's layers for a wavelength selective switch in accordance with an embodiment of the invention.
Figure 8:
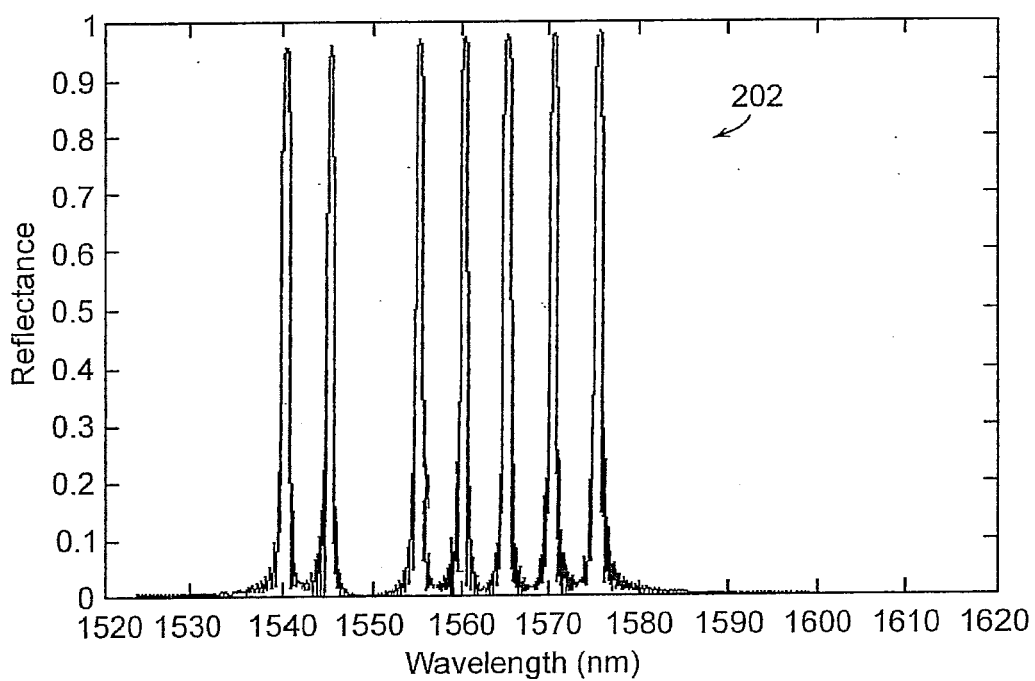
FIG. 8 shows an illustrative graphical representation of a filter function showing wavelength versus reflectance for a structure whose refractive index profile is shown in FIG. 7.
Figure 9:
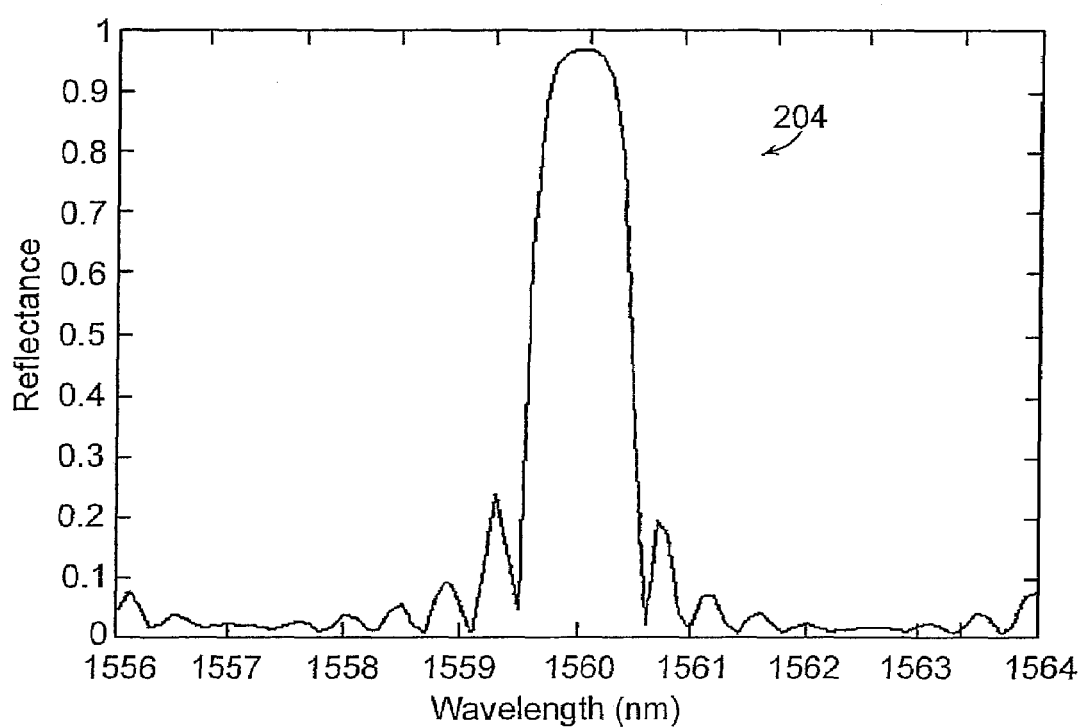
FIG. 9 shows an illustrative a graphical representation of a portion of the filter function shown in FIG. 8.

For a 100 GHz wavelength division multiplexed system, less than 0.3 nm selectivity may be obtained at −0.5 dB, less than 0.8 nm at −3 dB, and less than 1.0 nm at −25 dB. FIG. 6 shows at 100 the refractive index profile over a grating's layers that may be derived using the algorithm described above. The total range in amplitude on the vertical axis is $\Delta n = 0.14$. The structure may be employed to implement the filter function shown at 102 in FIG. 6 in which one frequency peak (about 1550 nm) is selectively removed. An enlarged view of the peak at 1560 nm is shown at 104 in FIG. 7.

Systems of the invention may be used, for example, as a single spatial port, and in a system for selectively dropping an arbitrary reconfigurable set of channels. This may be useful in creating networks that use light to reconfigure their connections. Protocols such as MPAS have been developed to utilize such components. The elements, therefore, may serve as one element in an array to enable construction of a compact integrated switch with N spatial inputs, N spatial outputs, and M wavelengths of each of these input/output fibers.

Those skilled in the art will appreciate that numerous modifications and variations may be made to the above disclosed embodiments without departing from the spirit and scope of the invention.

What is claimed is:

1. A wavelength selective switch device comprising an elongated signal communication path extending from a first end of said device to a second end of said device, said signal communication path extending though a plurality of regions of varying indices of refraction, and said plurality of regions including alternating fixed regions having a fixed index of refraction, and adjustable regions that are each coupled to an adjustable voltage source for changing a voltage potential across each of said adjustable regions such that the index of refraction of said adjustable regions may be changed by changing the voltage potential across each said adjustable region, said plurality of regions providing a fixed periodicity when no voltage is applied to any of said plurality of regions, said fixed periodicity being provided by the alternating fixed regions and adjustable regions being formed of different materials having different indices of refraction when no voltage is applied to the adjustable regions.

2. The device as claimed in claim 1, wherein the voltage source associated with each said adjustable region may be adjusted independent of the voltage sources associated with other adjustable regions.

3. The device as claimed in claim 1, wherein each said adjustable region is coupled to ground.

4. The device as claimed in claim 1, wherein each said adjustable region is formed of any of lithium niobate (NLiNBO$_3$), azobenzene-doped polymers such as PMMA, barium titanate (BaTiO2), indium galium arsenide phosphide (InGaAsP) qauntum sells, or poled polymers.

5. The device as claimed in claim 1, wherein each of said fixed region is formed of any of indium phosphide (InP), silica (SiO$_2$), polymers such as poly-methyl methacrylate (PMMA), and sol-gel glasses.

6. The device as claimed in claim 1, wherein each said adjustable region includes a core material and a cladding material, and said adjustable voltage source is coupled to cladding material of each respective adjustable region.

7. The device as claimed in claim 1, wherein said communication path provides a grating profile, and said adjustable voltage sources are employed to provide a modulation of the grating profile along a length of said communication path.

8. The device as claimed in claim 7, wherein said communication path is characterized as having an index contrast function that varies along the length of the communication path.

9. The device as claimed in claim 7, wherein said communication path is characterized as having an index contrast function that is fixed.

10. A wavelength selective switch device comprising an elongated signal communication path extending from a first end of said device to a second end of said device, said signal communication path extending through a grating including a plurality of regions of varying indices of refraction, and said plurality of regions including alternating fixed regions having a fixed index of refraction, and adjustable regions that are each coupled to an independently adjustable voltage source for changing a voltage potential across each of said adjustable regions such that the index of refraction of said adjustable regions maybe changed by changing the voltage potential across each said adjustable region to thereby cause a grating profile of said device to change along a length of the communication path, said plurality of regions providing a fixed periodicity when no voltage is applied to any of said plurality of regions, said fixed periodicity being provided by the alternating fixed regions and adjustable regions being formed of different materials having different indices of refraction when no voltage is applied to the adjustable regions, each of said fixed regions being formed of any of indium phosphide (InP), silica (SiO$_2$), polymers such as poly-methyl methacglate (PMMA), and sol-gel glasses, and each of said adjustable regions being formed of any of lithium niobate (NLiNBO$_3$), azobenzene-doped polymers, PMMA, barium titanate (BaTiO2), indium galium arsenide phosphide (InGaAsP) qauntum sells, and poled polymers.

11. The device as claimed in claim 10, wherein each said adjustable region is coupled to ground.

12. The device as claimed in claim 10, wherein each said adjustable region is adjacent a non-adjustable region.

13. The device as claimed in claim 10, wherein each said adjustable region includes a core material and a cladding material, and said associated adjustable voltage source is coupled to said cladding material.

14. The device as claimed in claim 10, wherein said communication path provides a grating profile, and said adjustable voltage sources are employed to provide a modulation of the grating profile along a length of said communication path.

15. The device as claimed in claim 14, wherein said communication path is characterized as having an index contrast function that varies along the length of the communication path.

16. The device as claimed in claim 14, wherein said plurality of regions provides a grating, and a pitch of said grating is fixed.

17. The device as claimed in claim 10, wherein said device is characterized as having a varying average index of refraction to provide that a plurality of wavelengths of signals may be switched at the same time.

18. A method of adjusting a wavelength selective switch device, said method comprising the steps of providing a plurality of regions having a fixed periodicity when no voltage is applied to any of said plurality of regions, said fixed periodicity being provided by alternating fixed regions having a fixed index of refraction and adjustable regions formed of a material different than the fixed regions, said adjustable regions having an adjustable index of refraction that is different than the fixed index of refraction of the fixed regions when no voltage is applied to the adjustable regions, and varying a voltage potential at each of a plurality of locations along said device associated with at least some of the adjustable regions to alter the index of refraction of said plurality of respective adjustable regions along said device.

* * * * *